United States Patent [19]
Eichmann

[11] Patent Number: 5,845,832
[45] Date of Patent: Dec. 8, 1998

[54] REAR-MOUNTED VEHICLE CARGO CARRIER

[76] Inventor: Marty W. Eichmann, 26845 N. Brooken Ave., Canyon Country, Calif. 91351

[21] Appl. No.: 933,157

[22] Filed: Sep. 18, 1997

[51] Int. Cl.⁶ ..................................................... B60R 11/00
[52] U.S. Cl. .......................... 224/509; 224/495; 224/502
[58] Field of Search ...................................... 224/509, 495, 224/502, 503, 504, 505, 506, 507, 508, 511, 518, 521, 924, 499, 497

[56] References Cited

U.S. PATENT DOCUMENTS

| | | | |
|---|---|---|---|
| 5,518,159 | 5/1996 | DeGuevara | 224/509 |
| 5,544,799 | 8/1996 | Didlake | 224/509 |
| 5,664,717 | 9/1997 | Joder | 224/924 |
| 5,690,260 | 11/1997 | Aikins et al. | 224/924 |

*Primary Examiner*—David J. Walczak
*Attorney, Agent, or Firm*—Allan M. Shapiro

[57] ABSTRACT

The rear-mounted vehicle cargo carrier includes a mounting bar for detachable mounting on a vehicle. A first arm is pivotally mounted on the mounting bar. The first arm pivotally carries a second arm. A frame bar is pivotally carried on the second arm. The frame bar is part of the cargo carrier rack, which has fittings suitable to carry the selected cargo. With this structure, the rack can be swung in any desired direction out of the way of the rear doors or tailgates of the vehicle. A locking pin locks the rack and arms to the mounting bar in folded, travel position.

32 Claims, 3 Drawing Sheets

REAR-MOUNTED VEHICLE CARGO CARRIER

FIELD OF THE INVENTION

This invention is directed to a cargo carrier which can be attached to the rear of an automotive vehicle. The carrier is locked in place and is mounted on arms so that, when unlocked, the carrier can be moved to a large number of different positions for access to the rear of the vehicle and for access to the carrier for loading and unloading its cargo.

BACKGROUND OF THE INVENTION

It is often useful to carry cargo, such as sports equipment, on the outside of an automotive vehicle. Such usage may be required because the interior is already sufficiently occupied by passengers and/or other cargo. Sometimes the cargo to be carried is of such large size that it is inconvenient to place it within the vehicle. Sports equipment, such as skis, bicycles, surfboards and the like are of such nature. Some feel it desirable to roof-mount the extra cargo. This is undesirable both for reasons of the windage while traveling and for the relative inaccessability of the roof for loading and unloading. While bicycles are sometimes carried on the roof, rear-mounting racks are also available for the carrying of bicycles. Some things, such as wheelchairs, are too heavy to conveniently place on the roof, and in some cases, have been placed on rear-mounted racks.

There are devices for mounting on the rear of a motor vehicle for the carrying of various different cargoes. There are trunk deck-mounting structures as well as rear bumper-mounting structures. Some motor vehicles are equipped with a receiver which is positioned beneath the bumper at the rear centerline of the vehicle. These receivers are normally employed for the placement of a trailer ball so that a trailer may be pulled by the motor vehicle. However, such receivers can also be employed to support other devices, such as bicycle racks. When such are mounted on the rear of a motor vehicle that has rear-opening tailgates or doors, those rear-mounted racks are in the way of access. Accordingly, there is need for a rear-mounted vehicle cargo carrier which can be moved to a convenient position for loading and unloading cargo and can be moved to a convenient position out of the way for access to, an opening of, rear doors and/or tailgates on the motor vehicle on which it is mounted.

SUMMARY OF THE INVENTION

In order to aid in the understanding of this invention, it can be stated in essentially summary form that it is directed to a rear-mounted vehicle cargo carrier. The vehicle cargo carrier has a mounting bar for preferably detachably mounting to a vehicle. The mounting bar pivotally carries a first arm, the first arm pivotally carries a second arm and the second arm pivotally carries a carrier rack configured to carry the desired cargo. The carrier rack and arms can be moved to engage the mounting bar and locked thereto for travel. Upon unlocking, the carrier rack can be swung to the left or right of the vehicle and/or moved away from the rear-opening doors or tailgate.

It is thus a purpose and advantage of this invention to provide a rear-mounted vehicle rack such as a mounting bar for attachment to the vehicle and has a first arm pivoted on the mounting bar, a second arm pivoted on the first arm and has a vehicle rack pivoted on the second arm so that the vehicle rack can be swung left and right of the vehicle or away from the vehicle.

It is a further purpose and advantage of this invention to provide a rear-mounted vehicle rack which can be swung to either side for loading and unloading so that it can be positioned for accessibility even in crowded parking locations.

It is a further purpose and advantage of this invention to provide a rear-mounted vehicle rack which is pivoted so that it can swing to either side so that it can be moved to a location to take advantage of an uneven parking place and moved to the downhill side, when the vehicle is laterally tilted.

It is another purpose and advantage of this invention to provide a rear-mounted vehicle rack which can be mounted in any standard receiver which is mounted on the rear of a large number of motor vehicles.

The features of the present invention, which are going to be novel, are set forth with particularity in the appended claims. The present invention, both as to its organization and manner of operation, together with further objects and advantages thereof, may be best understood by reference to the following description, taken in conjunction with the accompanying drawings.

DESCRIPTION OF THE PREFERRED EMBODIMENT

Figure 1:
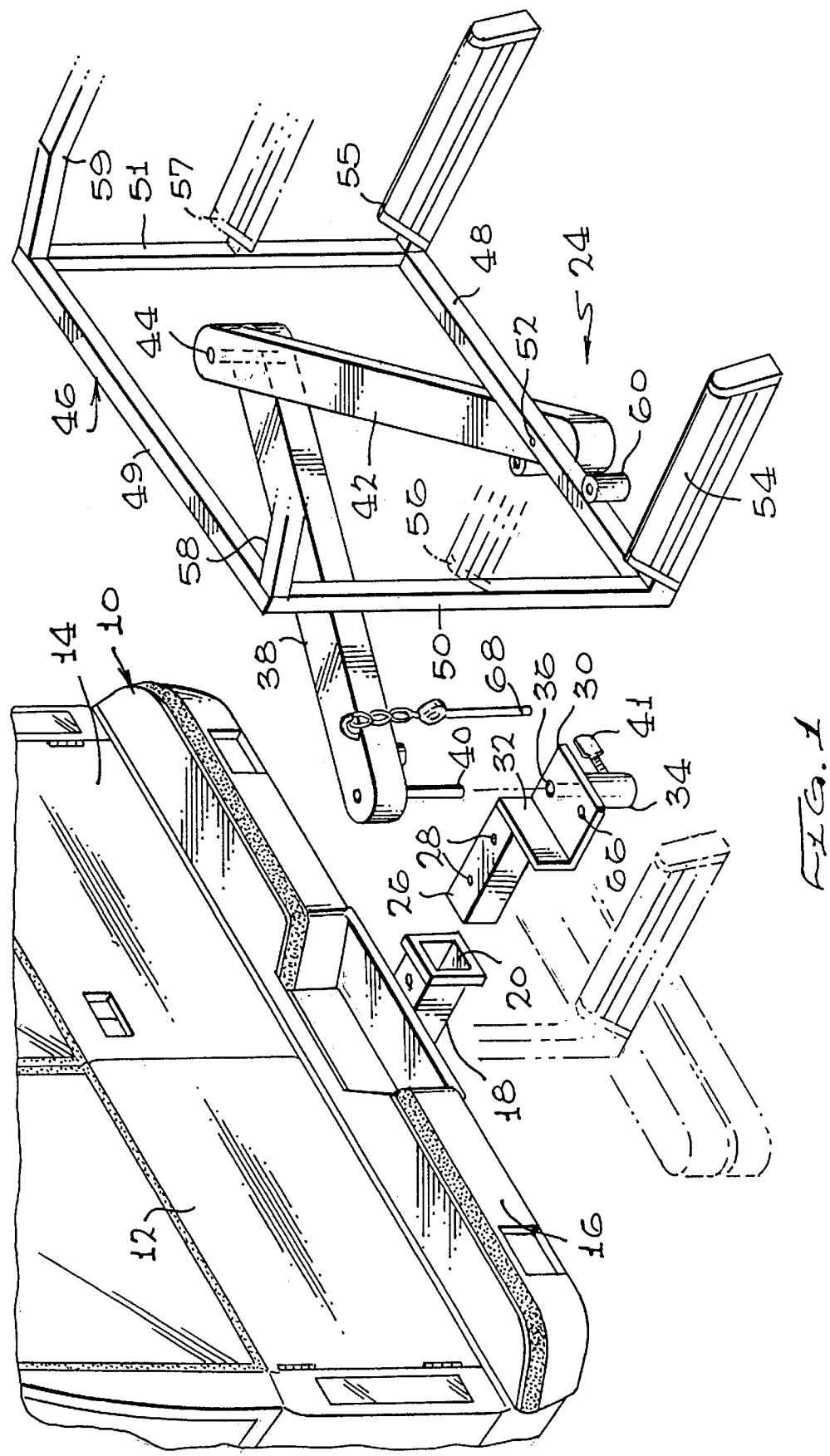
FIG. 1 is an isometric view of the rear-mounted vehicle cargo carrier in accordance with this invention, shown in partly exploded and partly open position and shown with respect to the rear of an automotive vehicle.

FIG. 1 shows the back end of a conventional motor vehicle 10 which has road wheels and is self-propelled by means of an internal combustion engine. The motor vehicle 10 illustrated is the type having rear access in the form of left and right doors 12 and 14. The doors 12 and 14 are on hinges with substantially vertical axes. The hinges are on the outer edges so that the doors part on the centerline and open outwards toward the sides. This is a specific illustration and the rear-mounted vehicle cargo carrier of this invention works just as well on vehicles with trunks, tailgates or doors hinged at the top to swing outwards and upwards from the bottom. The vehicle 10 may have a bumper 16 below the doors. The bumper 16 is usually mounted to the vehicle frame so that there is minimum damage in low-speed collisions. Receiver 18 is rigidly mounted on the frame of the vehicle 10, is positioned below the bumper, and extends out substantially in line with the rear of the bumper. The receiver 18 is a standard structure and is often used for the support of a trailer hitch ball so that a trailer can be towed by the vehicle 10. The receiver 18 has a square opening 20 therein to receive a bar on which the trailer ball is mounted. A cross pin 22, see FIG. 5, holds the bar in place.

Figure 2:
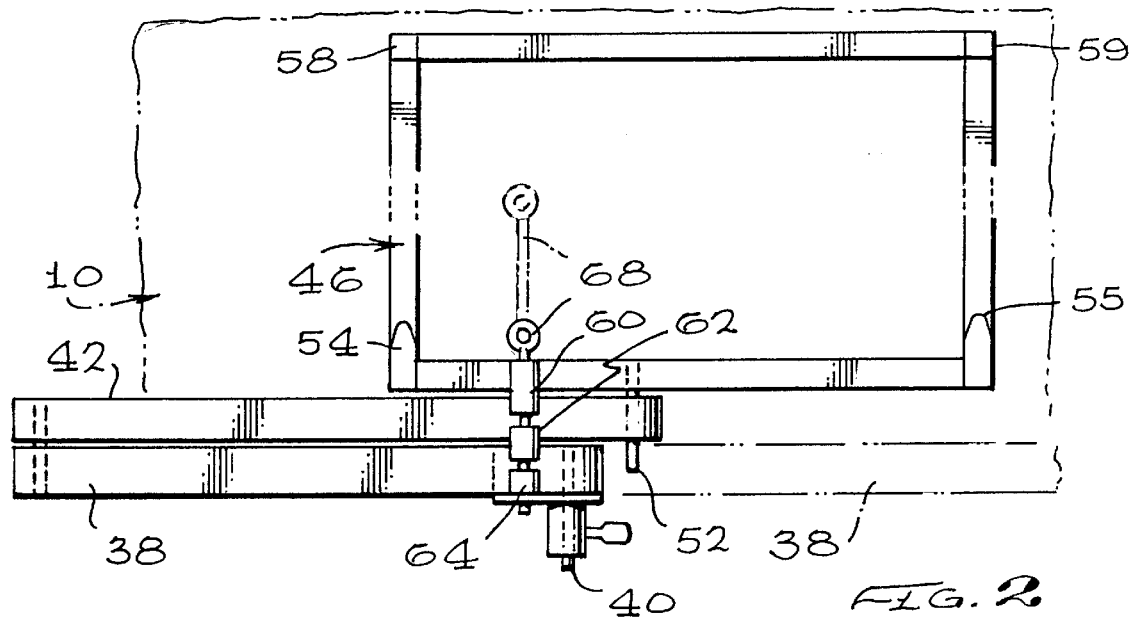
FIG. 2 is a rear elevational view thereof, in the locked position.
Figure 3:
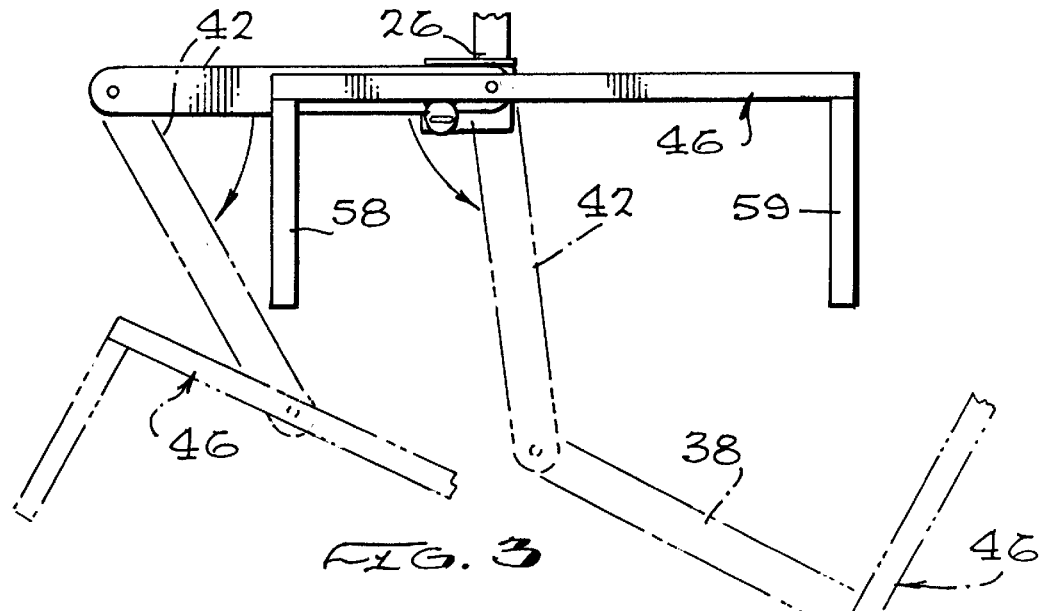
FIG. 3 is a plan view thereof, with the vehicle cargo carrier shown in full lines in the locked position and shown in dashed lines in several alternative open positions.
Figure 5:
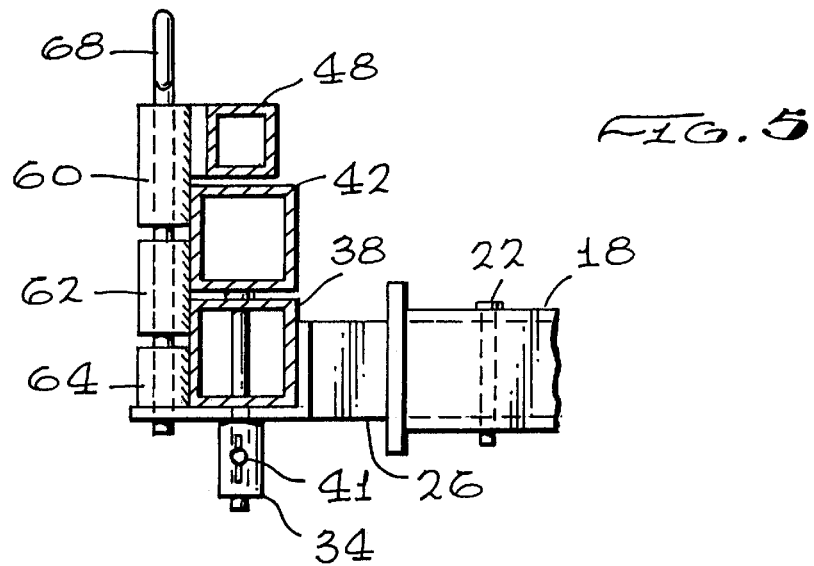
FIG. 5 is a upright sectional view taken generally along the line 5—5 of FIG. 6.
Figure 6:
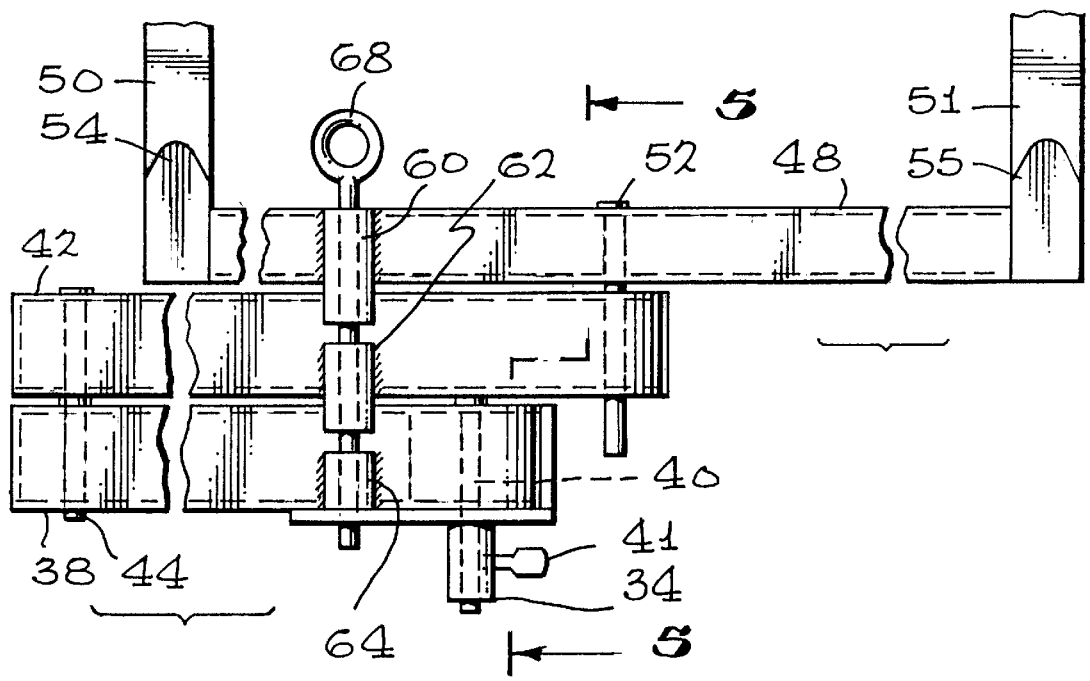
FIG. 6 is a rear elevational view, similar to FIG. 2 but enlarged, with parts foreshortened by breaking away.

The rear-mounted vehicle cargo carrier, indicated generally at 24, is seen in FIG. 1 in exploded partly extended position. In FIG. 2, it is seen in rear elevation. In FIG. 3, it is seen in plan view. In FIG. 5, a portion of it is seen in section, looking leftward toward the receiver 18. In FIG. 6, it is shown in elevational view as seen from the rear, when it is in locked position. In FIG. 6, parts are broken away to shorten the length of the several arms for convenience of illustration.

FIGS. 1 and 5 show mounting bar 26 which is sized to fit into the receiver 18 and is the main or only support of the vehicle cargo carrier with respect to the vehicle. The mounting bar is sufficiently strong to support the entire vehicle cargo carrier and the cargo mounted thereon, but sometimes an additional tie-down is helpful for reducing vibration. The mounting bar 26 has a pinhole 28 to receive the pin 22 to lock the mounting bar in the receiver. The outer end of the mounting bar carries flange 30. Flange 30 is generally horizontal when the vehicle 10 is horizontal. The flange 30 may be one of two flanges of an angle iron, the other flange 32 of which is welded to the rear end of mounting bar 26. Bearing post 34 is attached to the underside of flange 30, as by welding. Bearing hole 36 extends downward through the flange 30 and bearing post 34.

A first arm 38 of the cargo carrier 24 carries bearing pin 40 extending downwardly on its inner end. The configuration of the flange 30 and the positioning of bearing hole 36 is such that the first arm 38 can swing 180 degrees from its leftmost position (shown in FIG. 2) around to the right. In FIG. 1 it has not reached its rightmost position. Set screw 41 is positioned in a threaded hole through the side of bearing post 34. When the set screw is tightened, it clamps on bearing pin 40 to stop rotation of the bearing pin and stop rotation of first arm 38. In this way, the first arm 38 can be clamped in a selected position. The first 38 arm has a length which is preferably between one-half and onethird the total width of the vehicle 10 so that the outer end of the arm 38 does not extend beyond the sides of the vehicle.

A second arm 42 of the cargo carrier 24 is positioned above first arm 38. The inner end of the second arm 42 is pivoted to the outer end of the first arm 38 on pivot pin 44. As seen in FIGS. 2 and 6, the second arm 42 is preferably slightly longer than the first arm 38.

A carrier rack, indicated generally at 46 can be configured to carry the desired cargo. The illustrated rack 46 has a rectangular frame which includes bottom and top horizontal frame bars 48 and 49, and upright frame bars 50 and 51. The bottom frame bar 48 carries a downwardly directed pivot pin 52 (see FIGS. 1, 2 and 6) which engages through a bearing hole in the outer end of second arm 42. In this way, the bottom frame bar 48 and the entire carrier rack 46 are pivotal on a vertical axis on the end of second arm 42. The rack 46 may carry any structural elements which are helpful in carrying a particular kind of cargo. For example, arms with hooks would help it carry bicycles. In the illustrated version, ski clamps 54, 55, 56 and 57 are mounted on bars extending rearwardly from the rack 46. Other configurations of bars, clamps and housings would be convenient for carrying other varieties of cargo. Manual handle bars 58 and 59 are convenient for manipulation of the carrier rack 46 as well as the entire cargo carrier 24 with its arms 38 and 42. For convenience of designation, the orientation of the rack 46, as seen in FIG. 1, will be called rearward facing because it faces in the same direction as the rear of the automotive vehicle 10.

Figure 4:
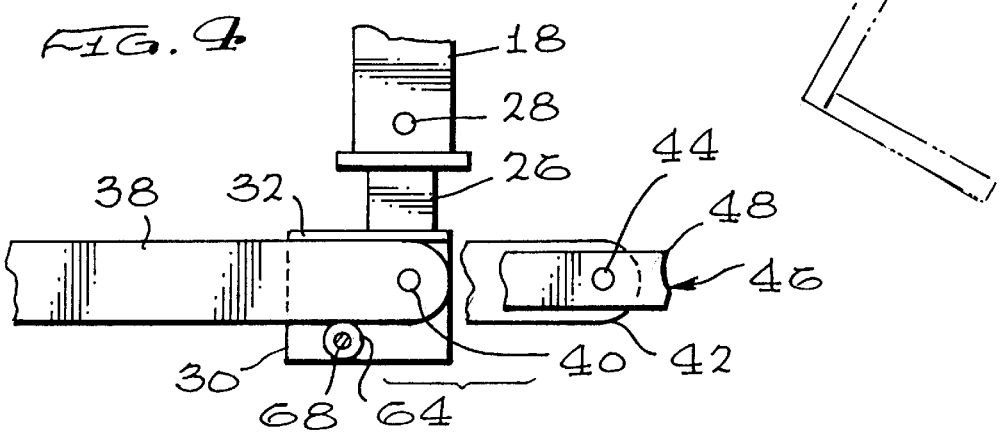
FIG. 4 is a plan view of the mounting bar and showing the arms of the vehicle cargo carrier in locked position, with parts broken away.

The pivoting of carrier rack 46 on the outer end of second arm 42, the pivoting of second arm 42 on the outer end of first arm 38 and the pivoting of the inner end of first arm 38 on mounting bar 26 permit a wide degree of motion of rack 46 with respect to motor vehicle 10. In the locked travel position, both the first and second arms 38 and 42 respectively are positioned to the left, as seen in FIGS. 2 and 6; also note the solid line showing in FIG. 3 and the partial showing in FIG. 4. When released from the travel position, the rack 46 may be swung to the left, as in FIG. 3 in broken lines, to permit access and opening of door 14. It may be moved straight back for opening both doors. It may be swung to the left or to the right, as also seen in FIG. 3 in broken lines, for loading on the left or right side of the vehicle. The positioning of the rack for loading and/or unloading may be dictated by the fact that the motor vehicle is not parked on absolutely level ground. If the ground slopes to the right, swinging the rack to the right provides more stability. Furthermore, since the arms are pivoted at both of their ends, the rack may be moved into an infinite number of positions with the back of the rack facing in almost any selected position. In this way, tremendous convenience is provided both for positioning the rack for loading and unloading as well as for access to the tailgate or rear doors of the vehicle.

Stops are provided to properly position the rack and arms for locking, and a lock pin is provided for locking the rack and arms in travel position. As is best seen in FIGS. 1, 5 and 6, stop tube 60 is secured to the back of bottom frame bar 48. The stop tube 60 extends below the bottom of the bar 48 so that, when rack 46 is rotated in the clockwise direction on the second arm 42, the lower end of the stop tube 60 engages against the back side of second arm 42. Similarly, stop tube 62 is secured to the back side of second arm 42 and extends therebelow to engage against the back side of first arm 38. In addition, stop tube 64 is secured to the back of first arm 38 but is even with the bottom thereof. These stop tubes are aligned with each other and with stop pin opening 66 (see FIG. 1) when the arms are swung forward on the left side and the rack 46 is in the rear-facing position. In this position, stop pin 68 can be inserted to lock the arms and rack frame into that travel position. Access to the rear doors and/or tailgate of the vehicle is easily achieved by pulling the stop pin 68 upward free of its stop tubes and then swinging the rack to left, right or pulling it rearwardly as desired.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A rear-mounted vehicle cargo carrier comprising:

a mounting bar for mounting on the rear of a vehicle;

a first arm pivotally mounted on said mounting bar on a vertical axis;

a second arm pivotally mounted on said first arm on a vertical axis substantially parallel to said pivot axis of said first arm; and a carrier rack pivotally mounted on said second arm so that said rack can be swung away from said second arm and away from said mounting bar to a plurality of different angles and distances from said mounting bar.

2. A rear-mounted vehicle cargo carrier comprising:

a mounting bar for mounting on the rear of a vehicle;

a first arm pivotally mounted on said mounting bar;

a second arm pivotally mounted on said first arm; and a carrier rack pivotally mounted on said second arm, said pivotal mounting of said first arm on said mounting bar, said pivotal mounting of said second arm on said first arm and said pivotal mounting of said carrier rack on said second arm are all on substantially vertical pivot axes so that said rack can be swung away from said mounting bar to a Plurality of different angles and distances from said mounting bar.

3. The rear-mounted vehicle cargo carrier of claim 2 wherein said carrier rack is configured to have means thereon for carrying a particular selected kind of cargo.

4. The rear-mounted vehicle cargo carrier of claim 3 wherein said means for carrying selected kind of cargo on said carrier rack is selected from the group consisting of means for carrying skis and means for carrying bicycles.

5. The rear-mounted vehicle cargo carrier of claim 2 wherein said axes are substantially parallel to each other.

6. The rear-mounted vehicle cargo carrier of claim 5 wherein said carrier rack has means thereon for attachment of cargo to said rack.

7. The rear-mounted vehicle cargo carrier of claim 2 wherein a folded position is defined when a portion of said carrier rack overlies said second arm and said second arm overlies said first arm, and further including a lock releasably holding said carrier rack and said arms in said folded position.

8. The rear-mounted vehicle cargo carrier of claim 7 further including a stop engaged between said carrier rack and said second arm and a stop engaged between said second arm and said first arm to releasably stop said carrier rack with respect to said second arm and said second arm with respect to said first arm in said folded position.

9. The rear-mounted vehicle cargo carrier of claim 8 wherein each of said stops comprises a tube, with said tubes being aligned when in said folded position so that a lock pin may be placed therethrough to lock said arms and said carrier rack in the folded position.

10. The rear-mounted vehicle cargo carrier of claim 7 wherein a portion of said carrier rack and said first and second arms are made of tubular material.

11. A rear-mounted vehicle cargo carrier comprising:
a mounting bar, said mounting bar being configured for attachment to the rear of a motor vehicle;
a first arm having an inner end and an outer end, first pivot means on said inner end of said first arm for interengaging with said mounting bar for pivotally mounting said first arm on said mounting bar on a substantially vertical first axis when said mounting bar is attached to a motor vehicle;
a second arm, said second arm having an inner end and an outer end, second pivot means on said second arm for pivotally mounting said inner end of said second arm on said outer end of said first arm, said second pivot means permitting rotation of said second arm with respect to said first arm on a second axis which is substantially parallel to said first axis;
a carrier rack for carrying cargo, said carrier rack having a frame bar, third pivot means for pivotally mounting said frame bar on said outer end of said second arm on a third axis which is substantially parallel to said first axis; and
means for releasably retaining said carrier rack in a retained position with respect to said mounting bar and for releasing said carrier rack so that it can be selectively positioned and angularly directed with respect to said mounting bar.

12. The rear-mounted vehicle cargo carrier of claim 11 wherein said carrier rack is configured to have means thereon for carrying a particular selected kind of cargo.

13. The rear-mounted vehicle cargo carrier of claim 12 wherein said means for carrying selected cargo on said carrier rack is selected from the group consisting of means for carrying skis and means for carrying bicycles.

14. The rear-mounted cargo carrier of claim 11 wherein there is a stop engaged between said carrier rack and said second arm when said carrier rack is in its retained position.

15. The rear-mounted vehicle cargo carrier rack of claim 14 wherein there is a stop engaged between said second arm and said first arm when said carrier rack is in its retained position.

16. The rear-mounted vehicle cargo carrier of claim 15 wherein said stops are tubular and said means for retaining comprises a locking pin positioned through said tubular stops.

17. The rear-mounted vehicle cargo carrier of claim 16 wherein there is a locking pin opening in said mounting bar and said locking pin extends through said stops and through said locking pin opening in said mounting bar when said carrier rack is in its retained position.

18. The rear-mounted vehicle cargo carrier of claim 11 wherein said arms are tubular.

19. The rear-mounted vehicle cargo carrier of claim 11 wherein there is means for carrying cargo on said carrier rack and said means comprises means for releasably retaining skis.

20. The rear-mounted vehicle cargo carrier of claim 11 wherein said mounting bar is square and is configured to be releasably engaged in a receiver for mounting on a motor vehicle.

21. A rear-mounted vehicle cargo carrier comprising:
a mounting bar, said mounting bar including a flange which is substantially horizontal when said mounting bar is attached to an automotive vehicle, a flange lock pin opening in said flange;
a first arm, first pivot means for pivotally mounting said first arm on said mounting bar, a first lock pin opening on said first arm, said first arm having a folded position with respect to said mounting bar when said first lock pin opening is in alignment with said flange lock pin opening;
a second arm, second pivot means for pivotally mounting said second arm on said first arm so that said second arm is movable with respect to said first arm between a folded position and an extended position, a second lock pin opening on said second arm, said second lock pin opening being in alignment with said first lock pin opening when both said first and second arms are in folded position;
a carrier rack, third pivot means for pivotally mounting said carrier rack on said second arm so that said third arm is movable with respect to said second arm between a folded position and an extended position, a third lock pin opening on said carrier rack, said third lock pin opening being in alignment with said lock pin openings in said first and second arms and in said mounting bar when said carrier rack is in folded position; and
a lock pin for removable insertion into all said lock pin holes to retain said carrier rack, said second arm and said first arm in locked position with respect to said mounting bar.

22. The rear-mounted vehicle cargo carrier of claim 21 wherein said carrier rack is configured to have means thereon for carrying a particular selected kind of cargo.

23. The rear-mounted vehicle cargo carrier of claim 22 wherein said means for carrying selected cargo on said carrier rack is selected from the group consisting of means for carrying skis and means for carrying bicycles.

24. The rear-mounted vehicle cargo carrier of claim 21 wherein said first, second and third lock pin openings are in tubes secured to the sides of said first arm, said second arm and said carrier rack, respectively.

25. The rear-mounted vehicle cargo carrier of claim 24 wherein said tube on said carrier rack and said tube on said second arm respectively extend beyond said carrier rack and said second arm so as to serve as rotational stops on said carrier rack with respect to said second arm and said second arm with respect to said first arm, respectively.

26. The rear-mounted vehicle cargo carrier of claim 21 further including releasable locking means between said first arm and said mounting bar to releasably lock said first arm with respect to said mounting bar in a selected position.

27. The rear-mounted vehicle cargo carrier of claim 1 wherein said carrier rack is configured to have means thereon for carrying a particular selected kind of cargo.

28. The rear-mounted vehicle cargo carrier of claim 27 wherein said means for carrying selected cargo on said carrier rack is selected from the group consisting of means for carrying skis and means for carrying bicycles.

29. The rear-mounted vehicle cargo carrier of claim 28 wherein at least a portion of said carrier rack and said first and second arms are made of tubular material.

30. The rear-mounted vehicle cargo carrier of claim 1 wherein a folded position is defined when a portion of said carrier rack overlies said second arm and said second arm overlies said first arm, and further including a lock releasably holding said carrier rack and said arms in said folded position.

31. The rear-mounted vehicle cargo carrier of claim 30 further including a stop engaged between said carrier rack and said second arm and a stop engaged between said second arm and said first arm to releasably stop said carrier rack with respect to said second arm and said second arm with respect to said first arm in said folded position.

32. The rear-mounted vehicle cargo carrier of claim 31 wherein each of said stops comprises a tube, with said tubes being aligned when in the folded position so that a lock pin may be placed therethrough to lock said arms and said carrier rack in said folded position.

* * * * *